United States Patent
Hashimoto et al.

(10) Patent No.: US 10,046,773 B2
(45) Date of Patent: Aug. 14, 2018

(54) NOTIFICATION DEVICE AND NOTIFICATION METHOD

(71) Applicant: CLARION CO., LTD., Saitama-shi (JP)

(72) Inventors: Takeshi Hashimoto, Motomiya (JP); Kenji Kono, Tokyo (JP); Tetsuo Watanabe, Hasuda (JP); Yasuhiro Fujita, Kashiwa (JP)

(73) Assignee: CLARION CO., LTD., Saitama-Shi (JP)

( * ) Notice: Subject to any disclaimer, the term of this patent is extended or adjusted under 35 U.S.C. 154(b) by 0 days.

(21) Appl. No.: 15/736,760

(22) PCT Filed: Jun. 28, 2016

(86) PCT No.: PCT/JP2016/069087
§ 371 (c)(1),
(2) Date: Dec. 14, 2017

(87) PCT Pub. No.: WO2017/006802
PCT Pub. Date: Jan. 12, 2017

(65) Prior Publication Data
US 2018/0170229 A1 Jun. 21, 2018

(30) Foreign Application Priority Data
Jul. 8, 2015 (JP) .................. 2015-137013

(51) Int. Cl.
*B60W 50/14* (2012.01)
*B60N 2/90* (2018.01)
(Continued)

(52) U.S. Cl.
CPC ............. *B60W 50/14* (2013.01); *B06B 3/00* (2013.01); *B60N 2/90* (2018.02); *B60W 50/16* (2013.01);
(Continued)

(58) Field of Classification Search
CPC ......... B60N 2/90; B60W 50/16; B60W 50/14; H04R 1/025; B60T 2201/08; B06B 3/00; G08B 6/00
See application file for complete search history.

(56) References Cited

U.S. PATENT DOCUMENTS

2002/0184236 A1* 12/2002 Donath .................... B60R 1/00
2003/0109993 A1* 6/2003 Peat ...................... B60N 2/002
702/56
(Continued)

FOREIGN PATENT DOCUMENTS

JP 2008-77631 4/2008
JP 2008-129716 6/2008
(Continued)

OTHER PUBLICATIONS

International Search Report for corresponding International Application No. PCT/JP2016/069087, dated Sep. 20, 2016.

*Primary Examiner* — Thomas Alunkal
(74) *Attorney, Agent, or Firm* — Mori & Ward, LLP

(57) ABSTRACT

A notification device (1) includes a sweep signal generator (3) that generates a sweep signal by changing the frequency of a predetermined wave at a constant speed in a frequency band which allows exciters (EX1, EX2, EX3, EX4) to generate a vibration, a sweep signal divider (4) that divides the sweep signal into a higher-band sweep signal in a higher-frequency band including an overlap frequency band and a lower-band sweep signal in a lower-frequency band including the overlap frequency band, a signal output determination unit (2) that determines from which exciters the higher-band sweep signal and lower-band sweep signal should be outputted, and an output signal adjuster (9) that makes an adjustment for outputting the higher-band sweep signal and lower-band sweep signal from the exciters determined.

10 Claims, 9 Drawing Sheets

(51) Int. Cl.
  *B60W 50/16* (2012.01)
  *H04R 1/02* (2006.01)
  *B06B 3/00* (2006.01)
  *G08B 6/00* (2006.01)

(52) U.S. Cl.
  CPC .......... *H04R 1/025* (2013.01); *B60T 2201/08* (2013.01); *G08B 6/00* (2013.01)

(56) References Cited

U.S. PATENT DOCUMENTS

| | | | |
|---|---|---|---|
| 2005/0149251 A1* | 7/2005 | Donath | G01C 21/26 |
| | | | 701/532 |
| 2007/0241595 A1* | 10/2007 | Nathan | B06B 3/00 |
| | | | 297/217.3 |
| 2008/0129094 A1* | 6/2008 | Nakajima | A61H 23/0236 |
| | | | 297/217.4 |
| 2010/0234747 A1* | 9/2010 | Hatakeyama | A61B 5/02405 |
| | | | 600/509 |
| 2011/0018740 A1* | 1/2011 | Boren | G08B 6/00 |
| | | | 340/965 |
| 2012/0226418 A1* | 9/2012 | Veen | B60N 2/0232 |
| | | | 701/49 |
| 2012/0242465 A1 | 9/2012 | Murata et al. | |
| 2016/0150313 A1* | 5/2016 | Howard | H04R 1/2803 |
| | | | 381/71.4 |
| 2016/0325649 A1* | 11/2016 | Sugiyama | B60N 2/90 |
| 2017/0136842 A1* | 5/2017 | Anderson | B60G 17/016 |

FOREIGN PATENT DOCUMENTS

| | | |
|---|---|---|
| JP | 2009-31946 | 2/2009 |
| JP | 2011-37305 | 2/2011 |
| WO | WO 2011/071044 | 6/2011 |

* cited by examiner

| ALARM TYPE | DIRECTION OF ALARMING MATTER | COMBINATION OF SPEAKER AND NOTIFICATION SIGNAL | DESCRIPTION |
|---|---|---|---|
| DEPARTURE FROM LANE | LEFT | V1 → EX1<br>V2 → EX3 | ACTIVATE LEFT EXCITER<br>ACTIVATE EXCITERS FROM FRONT TO UPPER |
| | RIGHT | V1 → EX2<br>V2 → EX4 | ACTIVATE RIGHT EXCITER<br>ACTIVATE EXCITERS FROM FRONT TO UPPER |
| APPROACH OF VEHICLE | FRONT | V1 → EX1, EX2<br>V2 → EX3, EX4 | ACTIVATE ALL EXCITERS<br>ACTIVATE EXCITERS FROM FRONT TO UPPER |
| | REAR | V1 → EX3, EX4<br>V2 → EX1, EX2 | ACTIVATE ALL EXCITERS<br>ACTIVATE EXCITERS FROM UPPER TO FRONT |
| DOZE DETECTION | - | V1 → EX1, EX2, EX3, EX4 | ACTIVATE ALL EXCITERS |
| SHARP CURVE | FRONT | V1 → EX1, EX2<br>V2 → EX3, EX4 | ACTIVATE ALL EXCITERS<br>ACTIVATE EXCITERS FROM FRONT TO UPPER |

*FIG. 8(a)*

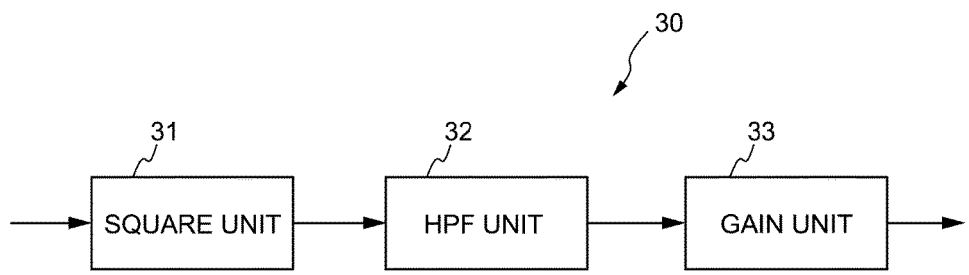

*FIG. 8(b)*

NOTIFICATION DEVICE AND NOTIFICATION METHOD

TECHNICAL FIELD

The present invention relates to a notification device and notification method and, more specifically, to a notification device and notification method that are able to notify the user through a vibration.

BACKGROUND ART

There has been proposed a vehicle alarm device that when the traveling vehicle departs from the lane, cautions (notifies) the driver by vibrating the driver's seat (see Patent Literature 1, paragraph [0029], FIGS. 1 and 2). This vehicle alarm device has vibrators installed in right and left positions of the seat surface of a seat. If the vehicle crosses the right lane marking, the vehicle alarm device vibrates the right vibrator; if the vehicle crosses the left lane marking, it vibrates the left vibrator.

There has been also proposed a vehicle alarm device that notifies the driver of directional information by causing multiple vibrators installed in slightly spaced positions of a seat frame to sequentially generate vibration and thus giving progressiveness to the vibrations (generating a vibration wave) (see Patent Literature 2, paragraphs [0064] to [0067], FIGS. 5 and 6).

These vehicle alarm devices allow the driver to feel, through a vibration, a caution (notification, alarm) issued in accordance with the situation of the vehicle.

CITATION LIST

Patent Literature

PTL 1: Japanese Unexamined Patent Application Publication No. 2008-129716
PTL 2: Japanese Unexamined Patent Application Publication No. 2011-37305

SUMMARY OF INVENTION

Technical Problem

However, in the case of the methods of giving a caution to the driver through a vibration, the driver may feel a vibration differently due to the structure of a frame in the seat, the installation positions of the vibrators, or the like. For this reason, these methods may fail to make a sufficient notification to the driver. For example, the vehicle alarm device disclosed in Patent Literature 1 is structured to give a vibration to the driver in such a manner that the vibration reaches a thigh and then a buttock and waist. However, it is not always easy for the driver to clearly determine the difference between left and right monotonous vibrations through the buttocks and waist.

In the case of the vehicle alarm device disclosed in Patent Literature 2, the vibrators are installed in a seat frame. For this reason, the vibration of the vibrators tends to cause resonance in the frame, meaning that a vibration may occur also in a position other than the installation positions (vibration positions) of the vibrators. As a result, vibrations may occur in multiple positions of the seat, posing a problem that the driver would have difficulty in recognizing directional information through vibrations even if vibrations sequentially occur in the slightly spaced positions.

The present invention has been made in view of the foregoing, and an object of the present invention is to provide a notification device and notification method that allow the driver to sufficiently recognize directional information.

Solution to Problem

A notification device according to one aspect of the present invention includes a plurality of exciters installed in cushion portions of a seat and being located in different positions of the seat, a sweep signal generator configured to generate a sweep signal capable of continuously changing a frequency of a vibration outputted from the exciters, by changing a frequency of a predetermined wave at a constant speed in a frequency band which allows the exciters to output a signal in the form of vibration, a sweep signal divider configured to divide the sweep signal into a higher-band sweep signal that continuously changes the frequency of the vibration by changing the frequency of the predetermined wave in a higher-frequency band which includes an overlap frequency band and whose frequencies are equal to or higher than frequencies in the overlap frequency band, the overlap frequency band being a part of the frequency band in which the frequency of the predetermined wave of the sweep signal is changed at the constant speed, and a lower-band sweep signal that continuously changes the frequency of the vibration by changing the frequency of the predetermined wave in a lower-frequency band which includes the overlap frequency band and whose frequencies are equal to or lower than the frequencies in the overlap frequency band, a signal output determination unit configured to determine that at least one of the higher-band sweep signal and the lower-band sweep signal should be outputted to at least one of the exciters and to determine that at least the other of the higher-band sweep signal and the lower-band sweep signal should be outputted to at least one of the other exciters, and an output signal adjuster configured to make an adjustment for outputting the higher-band sweep signal and the lower-band sweep signal to the at least one of the exciters and the at least one of the other exciters, determined by the signal output determination unit.

A notification method using a notification device according to another aspect of the present invention includes a sweep signal generation step of generating, by a sweep signal generator, a sweep signal capable of continuously changing a frequency of a vibration outputted from a plurality of exciters installed in cushion portions of a seat and being located in different positions of the seat, by changing a frequency of a predetermined wave at a constant speed in a frequency band which allows the exciters to output a signal in the form of vibration, a sweep signal division step of dividing, by a sweep signal divider, the sweep signal into a higher-band sweep signal that continuously changes the frequency of the vibration by changing the frequency of the predetermined wave in a higher-frequency band which includes an overlap frequency band and whose frequencies are equal to or higher than frequencies in the overlap frequency band, the overlap frequency band being a part of the frequency band in which the frequency of the predetermined wave of the sweep signal is changed at the constant speed, and a lower-band sweep signal that continuously changes the frequency of the vibration by changing the frequency of the predetermined wave in a lower-frequency band which includes the overlap frequency band and whose frequencies are equal to or lower than the frequencies in the overlap frequency band, a signal output determination step of determining, by a signal output determination unit, that at least one of the higher-band sweep signal and the lower-band sweep signal should be outputted to at least one of the exciters and determining that at least the other of the higher-band sweep signal and the lower-band sweep signal should be outputted to at least one of the other exciters, and an output signal adjustment step of making, by an output signal adjuster, an adjustment for outputting the higher-band sweep signal and the lower-band sweep signal to the at least one of the exciters and the at least one of the other exciters, determined in the signal output determination step.

In the notification device and notification method, the higher-band sweep signal and lower-band sweep signal outputted to the exciters are signals obtained by changing the frequency of the predetermined wave (e.g., a sinusoidal wave) at the constant speed in the frequency band which allows the exciters to output a signal in the form of vibration. For this reason, the frequency of the vibration can be continuously changed. Thus, by outputting the higher-band sweep signal and lower-band sweep signal to the different exciters installed in the seat, the user can be caused to feel vibrations whose frequency gradually changes, in direction positions of the seat. Also, the positions or timings where or when the vibrations caused by the higher-band sweep signal and lower-band sweep signal are outputted from the exciters are determined or adjusted by the signal output determination unit or output signal adjuster. Thanks to such determinations or adjustments, a directional notification can be made to the user.

In the notification device and notification method, the exciters are installed, especially in the cushion portions of the seat. Thus, the frame or the like of the seat can be prevented from resonating due to the vibrations of the exciters. Also, the user can be caused to more reliably feel the difference between the vibration positions.

The vibrations caused by the higher-band sweep signal and lower-band sweep signal are characterized in that the frequencies of the vibrations continuously change. Thanks to this characteristic, the user can be caused to feel changes in the vibrations in accordance with changes in the frequencies, whether one of the higher-band sweep signal or lower-band sweep signal vibrates in any one exciter or vibrates in a plurality of exciters simultaneously. That is, thanks to the changes in the vibrations caused by the changes in the frequencies, a notification can be made to the user through the changeful vibrations, which differ from monotonous vibrations.

Since the frequency band in which the frequency is changed at the constant speed differs between the higher-band sweep signal and lower-band sweep signal, when the higher-band sweep signal and lower-band sweep signal are outputted to different exciters, thus, the user can be caused to further feel changes in the vibration. Also, the higher-band sweep signal and lower-band sweep signal have the same changeable frequency band in the overlap frequency band. Thus, the user can be caused to feel a notification in such a manner that the vibration in the overlap frequency band is further emphasized.

In the notification device, in outputting the higher-band sweep signal and the lower-band sweep signal to the at least one of the exciters and the at least one of the other exciters, determined by the signal output determination unit, the output signal adjuster may start to output the higher-band sweep signal to the at least one of the exciters, then start to output the lower-band sweep signal to the at least one of the other exciters at the timing when the frequency of the predetermined wave of the higher-band sweep signal changing from a high frequency to a low frequency at the constant speed reaches a frequency in the overlap frequency band, and end output of the higher-band sweep signal to the at least one of the exciters at the timing when the frequency of the predetermined wave of the higher-band sweep signal changing from the high frequency to the low frequency at the constant speed departs from a frequency in the overlap frequency band.

In the notification method using the notification device, the output signal adjustment step of outputting the higher-band sweep signal and the lower-band sweep signal to the at least one of the exciters and the at least one of the other exciters, determined in the signal output determination step may include the output signal adjuster starting to output the higher-band sweep signal to the at least one of the exciters, then starting to output the lower-band sweep signal to the at least one of the other exciters at the timing when the frequency of the predetermined wave of the higher-band sweep signal changing from a high frequency to a low frequency at the constant speed reaches a frequency in the overlap frequency band, and ending output of the higher-band sweep signal to the at least one of the exciters at the timing when the frequency of the predetermined wave of the higher-band sweep signal changing from the high frequency to the low frequency at the constant speed departs from a frequency in the overlap frequency band.

The above described case of the notification device and notification method output a vibration caused by the higher-band sweep signal and a vibration caused by the lower-band sweep signal from different exciters in such a manner that a time difference occurs. Thus, the user can be caused to feel vibrations that occur in different positions, at different timings (with a time difference). In other words, the user can be caused to further feel a directional notification in the form of vibrations.

Specifically, the vibration caused by the higher-band sweep signal and the vibration caused by the lower-band sweep signal are outputted so as to overlap each other. For this reason, the user can be caused to first feel only the vibration caused by the higher-band sweep signal, to then feel a combination of the vibration caused by the higher-band sweep signal and the vibration caused by the lower-band sweep signal, and to lastly feel only the vibration caused by the lower-band sweep signal. By causing the user to feel the vibrations using the overlap with time differences as described above, a directional notification can be made to the user.

The vibrations outputted on the basis of both the higher-band sweep signal and lower-band sweep signal correspond to vibrations in the overlap frequency band. Accordingly, the frequency is changed in a state in which the vibrations of the two signals, the higher-band sweep signal and lower-band sweep signal, are combined. For this reason, when the user is caused to feel a combination of the vibration caused by the higher-band sweep signal and the vibration caused by the lower-band sweep signal, the vibrations can be further reinforced and the user can be caused to feel changes in the vibrations more remarkably compared to when the user is caused to feel only the vibration caused by the higher-band sweep signal. On the other hand, when the user is caused to feel only the vibration caused by the lower-band sweep signal, the vibration can be further attenuated and the user can be caused to feel changes in the vibration remarkably compared to when the user is caused to feel a combination of the vibration caused by the higher-band sweep signal and the vibration caused by the lower-band sweep signal.

The notification device may further include a frequency converter configured to generate a higher-band sound signal and a lower-band sound signal by frequency-converting the higher-frequency band in which the frequency of the predetermined wave of the higher-band sweep signal is changed at the constant speed and the lower-frequency band in which the frequency of the predetermined wave of the lower-band sweep signal is changed at the constant speed to frequency bands that allow the exciters to output a signal in the form of sound, a first adder configured to add the higher-band sound signal to the higher-band sweep signal to generate a first notification signal, and a second adder configured to add the lower-band sound signal to the lower-band sweep signal to generate a second notification signal. The signal output determination unit may determine that at least one of the first notification signal and the second notification signal should be outputted to the at least one of the exciters and determines that at least the other of the first notification signal and the second notification signal should be outputted to the at least one of the other exciters, and the output signal adjuster may output the first notification signal and the second notification signal to the at least one of the exciters and the at least one of the other exciters, determined by the signal output determination unit.

The notification method using the notification device may further include a frequency conversion step of generating, by a frequency converter, a higher-band sound signal and a lower-band sound signal by frequency-converting the higher-frequency band in which the frequency of the predetermined wave of the higher-band sweep signal is changed at the constant speed and the lower-frequency band in which the frequency of the predetermined wave of the lower-band sweep signal is changed at the constant speed to frequency bands that allow the exciters to output a signal in the form of sound, a first addition step of adding, by a first adder, the higher-band sound signal to the higher-band sweep signal to generate a first notification signal, and a second addition step of adding, by a second adder, the lower-band sound signal to the lower-band sweep signal to generate a second notification signal. The signal output determination step may include the signal output determination unit determining that at least one of the first notification signal and the second notification signal should be outputted to the at least one of the exciters and determining that at least the other of the first notification signal and the second notification signal should be outputted to the at least one of the other exciters, and the output signal adjustment step may include the output signal adjuster outputting the first notification signal and the second notification signal to the at least one of the exciters and the at least one of the other exciters, determined in the signal output determination step.

In the above described case of the notification device and notification method, a higher-band sound signal and a lower-band sound signal are generated by frequency-converting the frequency band of the higher-band sweep signal and the frequency band of the lower-band sweep signal to frequency bands which allow the exciters to output a signal in the farm of sound. A first notification signal is generated by adding the generated higher-band sound signal to the higher-band sweep signal, and a second notification signal is generated by adding the generated lower-band sound signal to the lower-band sweep signal.

The first notification signal and second notification signal each have both the signal component of the sweep signal frequency band that allows the exciters to output a signal in the form of vibration and the signal component of the sound signal frequency band that allows the exciters to output a signal in the form of sound. Thus, when the first notification signal or second notification signal is outputted to any exciter, the user can be caused to feel the notification through both a vibration and a sound at once and thus can be notified more reliably.

If a notification is made to the user through only a vibration using an exciter when a vibration from the road surface or the like can enter the vehicle, for example, when the vehicle is traveling, the user may have difficulty in feeling the vibration. In this case, by making a notification through not only a vibration but also a sound, the driver can be notified more reliably.

Since an exciter is able to output both a vibration and a sound, the use of an exciter to output a notification signal eliminates the need to provide multiple devices to output vibrations and sounds. Thus, both a vibration and a sound can be outputted using a single output device (exciter).

In the notification device, in outputting the first notification signal and the second notification signal to the at least one of the exciters and the at least one of the other exciters, determined by the signal output determination unit, the output signal adjuster may start to output the first notification signal to the at least one of the exciters, then starts to output the second notification signal to the at least one of the other exciters at the timing when the frequency of the predetermined wave changing from a high frequency to a low frequency at the constant speed in the frequency band of the higher-band sweep signal in the first notification signal reaches a frequency in the overlap frequency band, and ends output of the first notification signal to the at least one of the exciters at the timing when the frequency of the predetermined wave changing from the high frequency to the low frequency at the constant speed in the frequency band of the higher-band sweep signal in the first notification signal departs from a frequency in the overlap frequency band.

In the notification method using the notification device, the output signal adjustment step of outputting the first notification signal and the second notification signal to the at least one of the exciters and the at least one of the other exciters, determined in the signal output determination step may include the output signal adjuster starting to output the first notification signal to the at least one of the exciters, then starting to output the second notification signal to the at least one of the other exciters at the timing when the frequency of the predetermined wave changing from a high frequency to a low frequency at the constant speed in the frequency band of the higher-band sweep signal in the first notification signal reaches a frequency in the overlap frequency band, and ending output of the first notification signal to the at least one of the exciters at the timing when the frequency of the predetermined wave changing from the high frequency to the low frequency at the constant speed in the frequency band of the higher-band sweep signal in the first notification signal departs from a frequency in the overlap frequency band.

In the above described case of the notification device and notification method, the vibration and sound caused by the first notification signal including the higher-band sweep signal and higher-band sound signal and the vibration and sound caused by the second notification signal including the lower-band sweep signal and lower-band sound signal are outputted from different exciters in such a manner that a time difference occurs. Thus, the user can be caused to feel vibrations and sounds that occur in different positions, at different timings (with a time difference). As a result, the user can be caused to further feel directional notifications through vibrations and sounds.

Specifically, the vibration and sound caused by the first notification signal and the vibration and sound caused by the second notification signal are outputted so as to overlap each other. Thus, the user can be caused to first feel only the vibration and sound caused by the first notification signal, to then feel a combination of the vibration and sound caused by the first notification signal and the vibration and sound caused by the second notification signal, and to lastly feel only the vibration and sound caused by the second notification signal. By causing the user to feel the vibrations and sounds using the overlap with time differences as described above, a directional notification can be made to the user.

In the notification device, the signal output determination unit may determine that at least one of the signals should be outputted to at least one of the exciters, on the basis of a type of an alarm signal received from an alarm signal output unit.

In the notification device, it is determined to which of the exciters the higher-band sweep signal or the lower-band sweep signal, or the first notification signal or the second notification signal should be outputted, on the basis of the type of an alarm signal received from the alarm signal output unit. By outputting a different signal from a different exciter in accordance with the type of an alarm signal, the output timing or pattern of a vibration and a sound can be changed in accordance with the type of the alarm signal. By changing the notification method using vibrations and sounds in accordance with the type of an alarm signal as described above, the user can be caused to recognize the difference between the contents of notifications on the basis of the pattern or timing of the notification and can be caused to determine (recognize) the content of the alarm instantaneously.

In the notification device, the exciters may be installed in left and right positions of a seat surface of the seat and in left and right positions of a backrest of the seat.

In the above described case of the notification device, the exciters are installed in the left and right positions of the seat surface of the seat and in the left and right positions of the backrest of the seat. Thus, the user can be caused to feel a vibration and a sound through different areas of his or her body. In other words, the user can be caused to feel, through the areas of his or her body, changes in the frequency of the vibration or sound, the differences between the timings when vibrations or sounds are generated (time differences), or the differences between the places where vibrations or sounds are generated (the installation positions of the exciters). Thus, a directional notification can be made to the user, and the user can be caused to recognize the difference between the contents of alarms more clearly.

Advantageous Effects of Invention

According to an embodiment of the present invention of a notification device and notification method, a higher-band sweep signal and lower-band sweep signal outputted to exciters are signals obtained by changing a frequency of a predetermined wave at a constant speed in a frequency band which allows the exciters to output a signal in the form of vibration.

For this reason, the frequency of the vibration can be continuously changed. Thus, by outputting the higher-band sweep signal and lower-band sweep signal to the different exciters installed in a seat, the user can be caused to feel vibrations whose frequency gradually changes, in direction positions of the seat. Also, the positions or timings where or when the vibrations caused by the higher-band sweep signal and lower-band sweep signal are outputted from the exciters are determined or adjusted by a signal output determination unit or an output signal adjuster. Thanks to such determinations or adjustments, a directional notification can be made to the user.

In the notification device and notification method of the embodiment of the present invention, the exciters are installed, especially in the cushion portions of the seat. Thus, the frame or the like of the seat can be prevented from resonating due to the vibrations of the exciters. Also, the user can be caused to more reliably feel the difference between the vibration positions.

The vibrations caused by the higher-band sweep signal and lower-band sweep signal are characterized in that the frequencies of the vibrations continuously change. Thanks to this characteristic, the user can be caused to feel changes in the vibrations in accordance with changes in the frequencies, whether one of the higher-band sweep signal or lower-band sweep signal vibrates in any one exciter or vibrates in a plurality of exciters simultaneously. That is, thanks to the changes in the vibrations caused by the changes in the frequencies, a notification can be made to the user through the changeful vibrations, which differ from monotonous vibrations.

Since the frequency band in which the frequency is changed at the constant speed differs between the higher-band sweep signal and lower-band sweep signal, when the higher-band sweep signal and lower-band sweep signal are outputted to different exciters, thus, the user can be caused to further feel changes in the vibration. Also, the higher-band sweep signal and lower-band sweep signal have the same changeable frequency band in the overlap frequency band. Thus, the user can be caused to feel a notification in such a manner that the vibration in the overlap frequency band is further emphasized.

BRIEF DESCRIPTION OF DRAWINGS

FIGS. 4(a) and 4(b) show a state in which the sweep signals shown in FIG. 3 are divided by a sweep signal divider according to the embodiment, in which FIG. 4(a) shows the resulting first-half sweep signals; and FIG. 4(b) shows the resulting second-half sweep signals.

FIG. 8(a) is a table showing the alarm types of speaker control signals received from a signal controller by an output signal adjuster, the installation positions of the speakers, combinations of the speakers and notification signals, and the contents of notification processes. FIG. 8(b) is a block diagram showing a schematic configuration of a frequency expander according to the embodiment.

DESCRIPTION OF EMBODIMENTS

Figure 1:
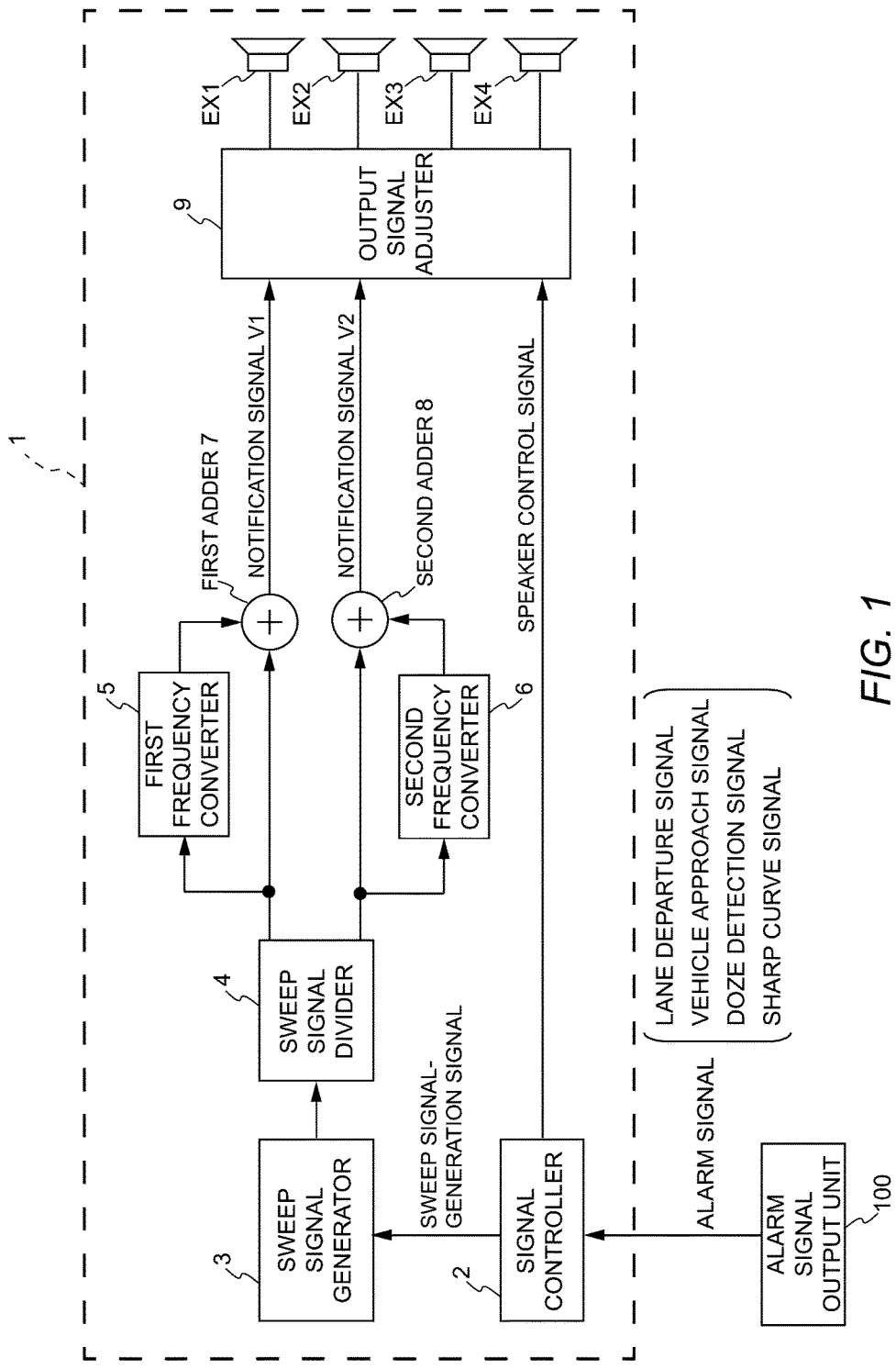
FIG. 1 is a block diagram showing a schematic configuration of a vehicle alarm device according to an embodiment.

Now, a vehicle alarm device serving as an example of a notification device according to the present invention will be described in detail with reference to the drawings. FIG. 1 is a block diagram showing a schematic configuration of a vehicle alarm device according to the present embodiment. A vehicle alarm device (notification device) 1 includes a signal controller (signal output determination unit) 2, a sweep signal generator 3, a sweep signal divider 4, a first frequency converter (frequency converter) 5, a second frequency converter (frequency converter) 6, a first adder 7, a second adder 8, an output signal adjuster 9, and four speakers EX1, EX2, EX3, EX4 (a plurality of exciters).

Signal Controller

The signal controller 2 outputs a sweep signal generation signal to the sweep signal generator 3. The signal controller 2 also outputs, to the output signal adjuster 9, a speaker control signal for performing control (making an adjustment) as to which of the speakers EX1 to EX4 should be caused to generate a vibration at what timing.

The signal controller 2 receives an alarm signal from an alarm signal output unit 100. The alarm signal output unit 100 is a device that outputs alarm signals such as a lane departure signal, a vehicle approach signal, a doze detection signal, and a sharp curve signal. A lane departure signal refers to an alarm signal that is outputted when the vehicle departs from the lane; a vehicle approach signal refers to an alarm signal that is outputted when an obstacle (a traveling vehicle, etc.) approaches the vehicle in front or rear of the vehicle); a doze detection signal refers to an alarm signal that is outputted when a doze of the driver is detected by detecting the angle of the face of the driver or the time interval between blinks of the driver or detecting the fluctuation of the center position of the steering; and a sharp curve signal refers to an alarm signal that is outputted when it is detected that a sharp curve lies in front of the vehicle. These alarming matters are detected using a typical method such as a method of capturing images of the front of the vehicle and analyzing the images or a method of detecting an alarming matter by radiating a radar wave forward and measuring a reflected wave.

When the signal controller 2 receives the alarm signal from the alarm signal output unit 100, it outputs a sweep signal generation signal to the sweep signal generator 3, as well as outputs, to the output signal adjuster 9, a speaker control signal corresponding to the type of the alarm signal received (one of a vehicle departure signal, a vehicle approach signal, a doze detection signal, and a sharp curve signal). What type of speaker control signal is outputted in accordance with the type of the alarm signal received will be described later.

Speakers EX1 to EX4

To caution the driver, the speakers EX1 to EX4 notify the driver by outputting a vibration and a sound simultaneously. In the present embodiment, exciters are used as the speakers EX1 to EX4. An exciter refers to a sound output device that is able to transmit a vibration force transmitted from a voice coil to an object in contact with the exciter and to cause the object to output a vibration and a sound as a diaphragm.

Figure 2:
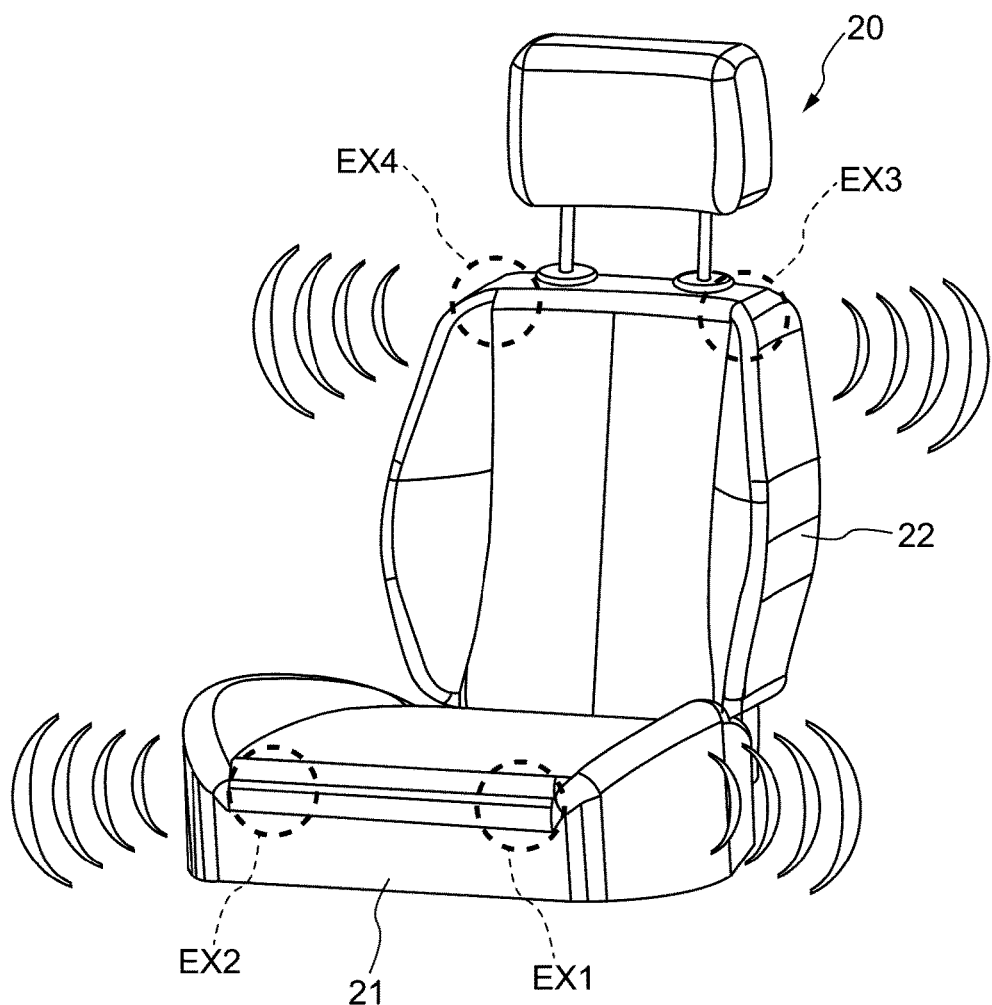
FIG. 2 is a drawing schematically showing a state in which speakers EX1 to EX4 according to the embodiment are installed in a driver's seat.

FIG. 2 is a drawing schematically showing a state in which the speakers EX1 to EX4 are installed in a driver's seat (seat) 20 of a vehicle. As shown in FIG. 2, the speaker EX1 is installed in a front-left portion of a seat surface 21 of the driver's seat 20; the speaker EX2 is installed in a front-right portion of the seat surface 21 of the driver's seat 20; the speaker EX3 is installed in an upper-left portion of a backrest 22 of the driver's seat 20; and the speaker EX4 is installed in an upper-right portion of the backrest 22 of the driver's seat 20. The speakers EX1 to EX4 are installed in a cushion that is the interior member of the seat surface 21 and backrest 22. The installation of the speakers EX1 to EX4 in the cushion rather than in a frame or the like can prevent a vibration from causing resonance or the like in any other member.

Sweep Signal Generator

Figure 3:
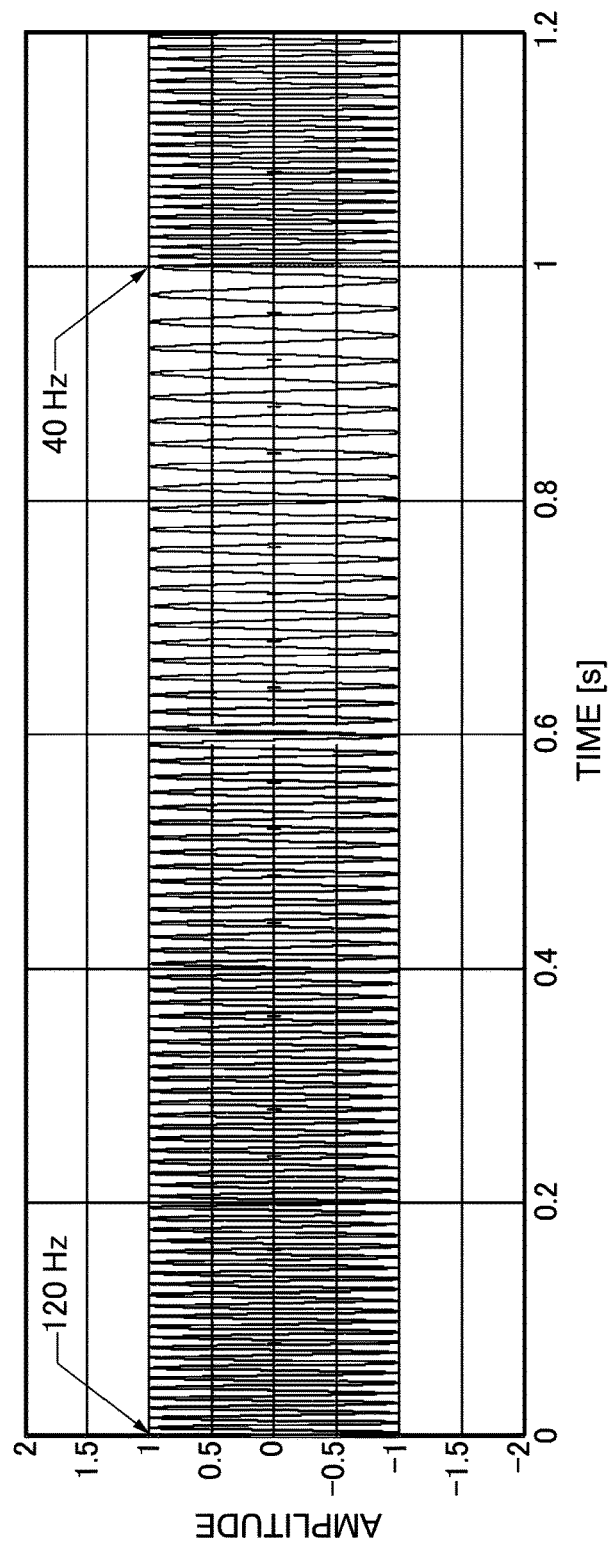
FIG. 3 is a diagram showing an example of sweep signals generated by a sweep signal generator according to the embodiment.

The sweep signal generator 3 generates a sweep signal having a sinusoidal wave. A sweep signal refers to a signal obtained by changing the frequency of a predetermined wave from an initial frequency to a target frequency at a constant speed. In the present embodiment, a sinusoidal wave is used as an example of the predetermined wave. When the sweep signal generator 3 receives the sweep signal generation signal from the signal controller 2, it generates a sweep signal by sweeping a sinusoidal wave from the initial frequency of 120 Hz to the target frequency of 40 Hz for the sweep time of 1 second, as shown in FIG. 3. The term "sweep" here refers to continuously changing the frequency at a constant speed. FIG. 3 shows an example of sweep signals repeatedly generated in cycles of 1 second. The output signal controller 3 outputs the generated sweep signal to the sweep signal divider 4.

While, in the present embodiment, the initial frequency is set to 120 Hz and the target frequency is set to 40 Hz, as shown in FIG. 3, this frequency range need not be used. Any other frequency range may be used as long as the frequency range allows the exciters to output a signal in the form of vibration. Also, it is preferred to use a frequency that makes the driver more likely to feel the vibration of the exciter, as long as the frequency range allows the exciters to output a vibration. The predetermined wave used to generate a sweep signal need not be necessarily a sinusoidal wave and may show any other waveform.

Sweep Signal Divider

The sweep signal divider 4 divides a sweep signal corresponding to one cycle generated by the sweep signal generator 3 into a first-half sweep signal and a second-half sweep signal on the basis of the frequency range in which the frequency of the sweep signal is changed (e.g., a range of 120 Hz to 40 Hz, as shown in FIG. 3). Specifically, the sweep signal divider 4 divides the sweep signal into a first-half sweep signal (higher-band sweep signal) and a second-half sweep signal (lower-band sweep signal) in such a manner that the frequency ranges of the first-half sweep signal and second-half sweep signal overlap each other to make an overlap frequency band. The term "higher-band sweep signal" here refers to a signal obtained by changing the frequency of a sinusoidal wave in a higher-frequency band that includes the overlap frequency band and whose frequencies are equal to or higher than those of the overlap frequency band. The term "lower-band sweep signal" refers to a signal obtained by changing the frequency of a sinusoidal wave in a lower-frequency band that includes the overlap frequency band and whose frequencies are equal to or lower than those of the overlap frequency band.

As described above, the sweep signal generator 3 according to the present embodiment generates a sweep signal with the initial frequency set to 120 Hz and the target frequency set to 40 Hz. For this reason, a sweep signal is generated by continuously changing the frequency of a sinusoidal wave from a high frequency to a low frequency at a constant speed. Accordingly, if the frequency of a sinusoidal wave is changed at a constant speed, the initial frequency becomes a high frequency, and the frequency value is changed to lower frequencies with a lapse of time. For this reason, the first-half sweep signal is generated as a sweep signal having a higher frequency band (higher-band sweep signal) than that of the second-half sweep signal. The second-half sweep signal is generated as a sweep signal having a lower frequency band (lower-band sweep signal) than that of the first-half sweep signal.

Figure 4A:
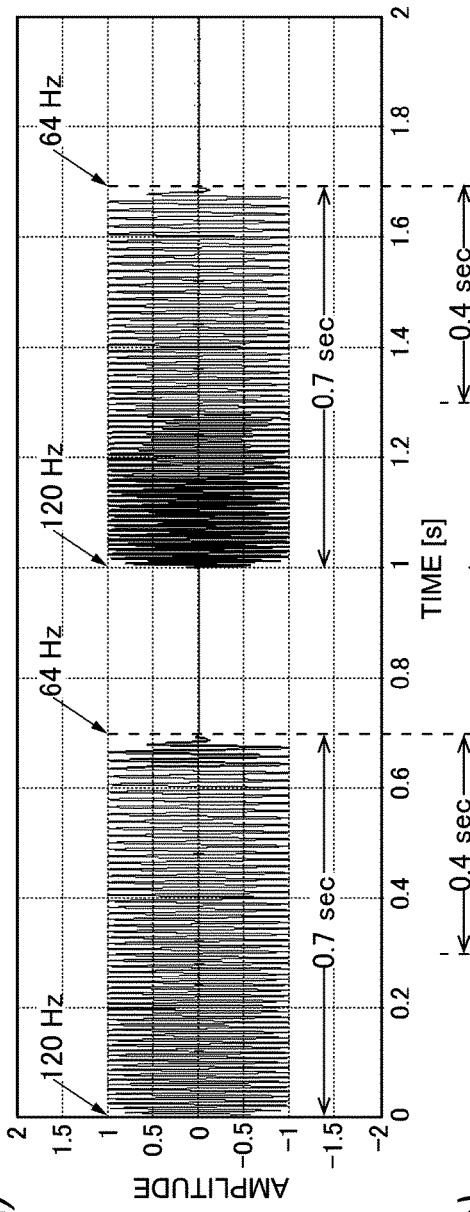
Figure 4B:
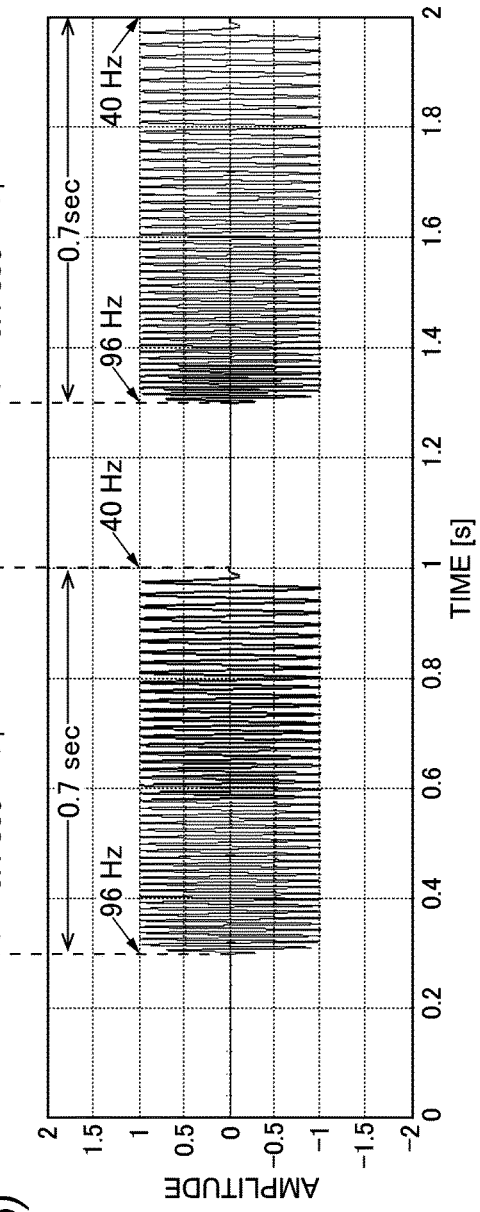

FIGS. 4(a) and 4(b) show a state in which the sweep signals shown in FIG. 3 are divided. FIG. 4(a) shows the resulting first-half sweep signals (higher-band sweep signals), and FIG. 4(b) shows the resulting second-half sweep signals (lower-band sweep signals). In the case of the first-half sweep signal (higher-band sweep signal), the initial frequency is set to 120 Hz, and the target frequency is set to 64 Hz. In the case of the second-half sweep signal (lower-band sweep signal), the initial frequency is set to 96 Hz, and the target frequency is set to 40 Hz. The sweep time of the first-half sweep signal is 0.7 seconds, and the sweep time of the second-half sweep signal is 0.7 seconds as well. The last 0.4 seconds of the first-half sweep signal and the initial 0.4 seconds of the second-half sweep signal coincide each other. Note that FIGS. 4(a) and 4(b) show the divided sweep signals corresponding to 2 cycles (2 seconds).

As shown in FIGS. 4(a) and 4(b), the rising edge of the divided sweep signal is subjected to fade-in processing (processing in which the amplitude is gradually increased), and the falling edge thereof is subjected to fade-out processing (processing in which the amplitude is gradually reduced). The performance of fade-in processing and fade-out processing allows for reductions in the unnecessary high frequencies of the rising and falling edge of the sweep signal.

Figure 5A:
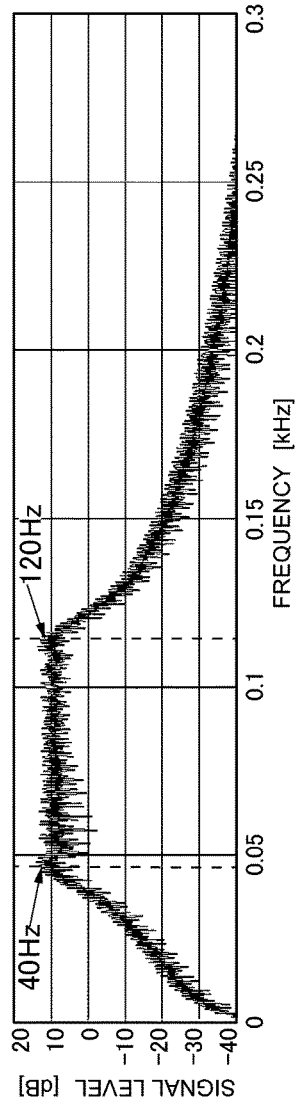
FIGS. 5(a), 5(b), and 5(c) show frequency characteristics of the sweep signals shown in FIGS. 3, 4(a) and 4(b).
Figure 5B:
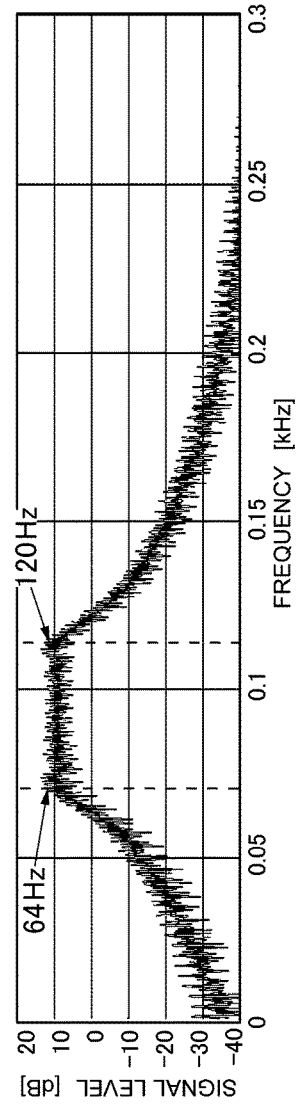
Figure 5C:
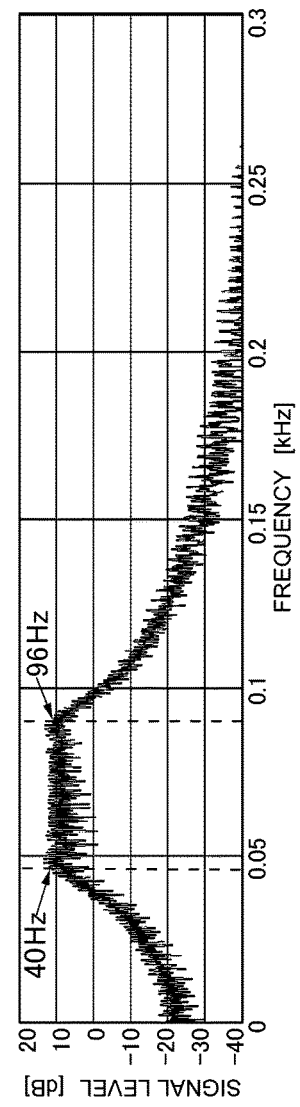

FIGS. 5(a), 5(b), and 5(c) show frequency characteristics of the sweep signals shown in FIGS. 3, 4(a) and 4(b). FIG. 5(a) shows frequency characteristics of the yet-to-be-divided sweep signal shown in FIG. 3; FIG. 5(b) shows frequency characteristics of the first-half sweep signal (higher-band sweep signal) shown in FIG. 4(a); and FIG. 5(c) shows frequency characteristics of the second-half sweep signal (lower-band sweep signal) shown in FIG. 4(b).

The frequency characteristics of FIG. 5(a) indicate high gain values (high signal levels) in a range of 40 Hz to 120 Hz, which is the sweep range; the frequency characteristics of FIG. 5(b) indicate high gain values (high signal levels) in a range of 64 Hz to 120 Hz, which is the sweep range; and the frequency characteristics of FIG. 5(c) indicate high gain values (high signal levels) in a range of 40 Hz to 96 Hz, which is the sweep range. From FIGS. 5(b) and 5(c), it is appreciated that the first-half sweep signal (higher-band sweep signal) and second-half sweep signal (lower-band sweep signal) resulting from the division overlap each other in a frequency band of 64 Hz to 96 Hz. As seen above, the range of 64 Hz to 96 Hz serves as an overlap frequency band. The overlap frequency band is included in the frequency band of the first-half sweep signal, as well as is included in the frequency band of the second-half sweep signal.

The frequency band of the first-half sweep signal (higher-band sweep signal) shown in FIG. 5(b) is a range of 64 Hz to 120 Hz. The frequency band of the first-half sweep signal (higher-band sweep signal) consists of the range of 64 Hz to 96 Hz serving as the overlap frequency band, as described above, as well as a higher-frequency band having frequencies equal to or higher than those of the overlap frequency band. The first-half sweep signal (higher-band sweep signal) is a signal obtained by changing the frequency of a sinusoidal wave from a high frequency to a low frequency in the frequency band of 64 Hz to 120 Hz at a constant speed. On the other hand, the frequency band of the second-half sweep signal (lower-band sweep signal) shown in FIG. 5(c) is a range of 40 Hz to 96 Hz. The frequency band of the second-half sweep signal (lower-band sweep signal) consists of the range of 64 Hz to 96 Hz serving as the overlap frequency band, as well as a lower-frequency band having frequencies equal to or lower than those of the overlap frequency band. The second-half sweep signal (lower-band sweep signal) is a signal obtained by changing the frequency of the sinusoidal wave from a high frequency to a low frequency in the frequency band of 40 Hz to 96 Hz at a constant speed.

First Frequency Converter and Second Frequency Converter

The first frequency converter 5 and second frequency converter 6 each generate, from the sweep signal divided by the sweep signal divider 4, a signal having higher frequencies than those of the sweep signal. The first frequency converter 5 receives the first-half sweep signals (higher-band sweep signals) and converts the frequency thereof, and the second frequency converter 6 receives the second-half sweep signal (lower-band sweep signal) and converts the frequency thereof. Since the first frequency converter 5 and second frequency converter 6 have quite the same internal configuration and processing details, only the first frequency converter 5 will be described in the present embodiment for convenience.

Figure 6:
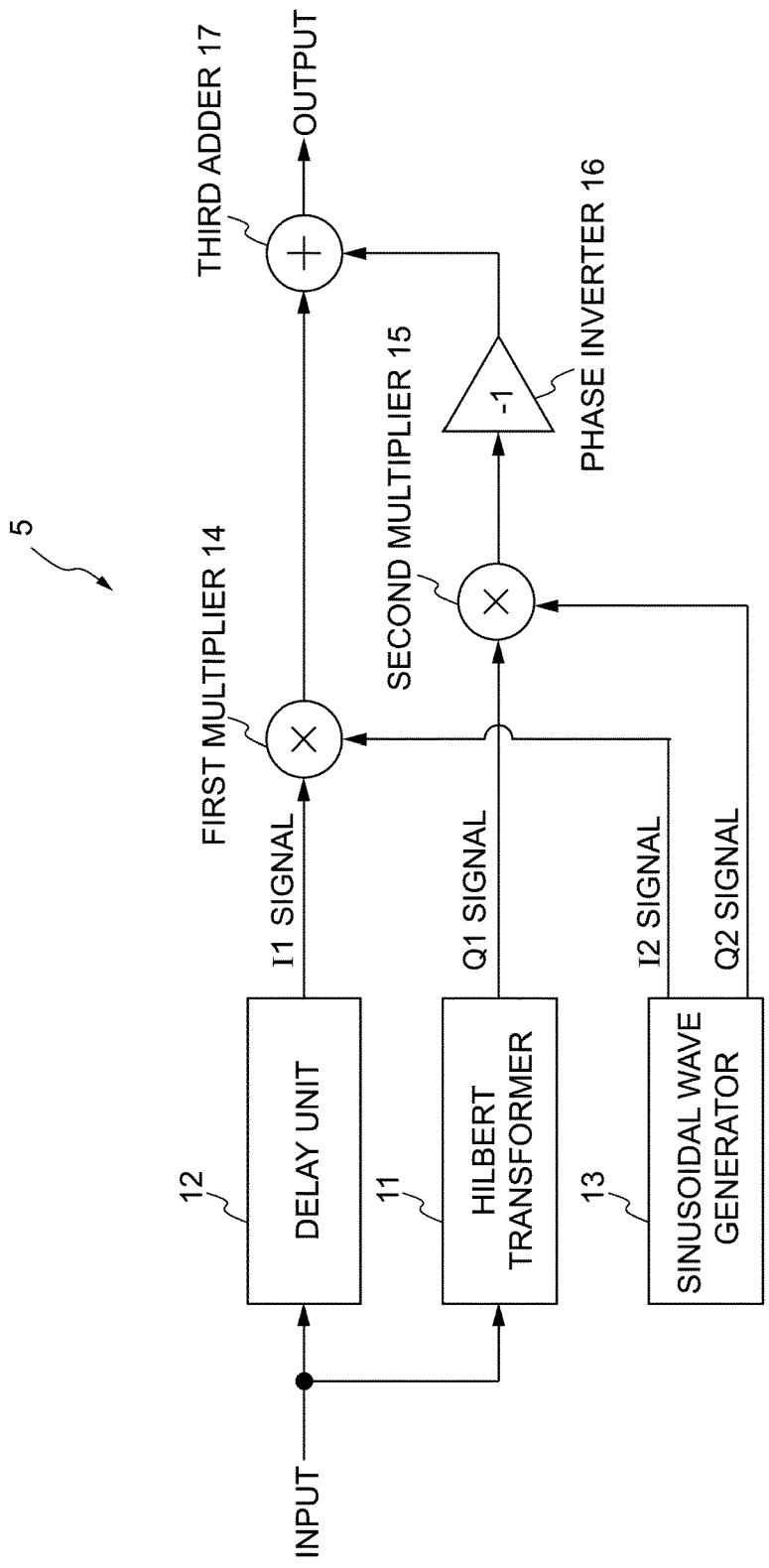
FIG. 6 is a block diagram showing a schematic configuration of a first frequency converter according to the embodiment.

FIG. 6 is a block diagram showing a schematic configuration of the first frequency converter 5. The first frequency converter 5 includes a Hilbert transformer 11, a delay unit 12, a sinusoidal wave generator 13, a first multiplier 14, a second multiplier 15, a phase inverter 16, and a third adder 17.

The sweep signal divided by the sweep signal divider 4 is inputted to the Hilbert transformer 11 and delay unit 12. Hereafter, the divided sweep signal (first-half sweep signal, second-half sweep signal) will be referred to as the division sweep signal. The Hilbert transformer 11 generates Q1 signal by rotating the phase of the received division sweep signal by 90°. The Hilbert transformer 11 according to the present embodiment consists of a finite impulse response (FIR) filter having a filter length of 128 taps. The Hilbert transformer 11 outputs the generated Q1 signal to the second multiplier 15.

The delay unit 12 corrects a delay that has occurred in the 90° phase rotation process performed by the Hilbert transformer 11. The delay unit 12 generates 0°-phase I1 signal by correcting the delay with respect to the received division sweep signal. The delay unit 12 then outputs the generated I1 signal to the first multiplier 14.

The sinusoidal wave generator 13 generates I2 signal formed of 0°-phase sinusoidal wave and Q2 signal formed of 90°-phase sinusoidal wave in accordance with a set conversion frequency. The sinusoidal wave generator 13 then outputs the generated 0°-phase I2 signal to the first multiplier 14 and outputs the generated 90°-phase Q2 signal to the second multiplier 15.

The first multiplier 14 multiplies the 0°-phase I1 signal received from the delay unit 12 and the 0°-phase I2 signal received from the sinusoidal wave generator 13. The first multiplier 14 then outputs the resulting signal to the third adder 17.

The second multiplier 15 multiplies the 90°-phase-rotated Q1 signal received from the Hilbert transformer 11 and the 90°-phase Q2 signal received from the sinusoidal wave generator 13. The second multiplier 15 then outputs the resulting signal to the phase inverter 16.

The phase inverter 16 inverts the phase of the received signal and outputs the resulting signal to the third adder 17. The third adder 17 adds the signal received from the second multiplier 15 (the signal obtained by multiplying the 90°-phase Q1 signal and 90°-phase Q2 signal and then inverting the phase of the resulting signal) to the signal received from the first multiplier 14 (the signal obtained by multiplying the 0°-phase I1 signal and 0°-phase I2 signal). The signal thus obtained by the third adder 17 is a signal in which a mirror image is suppressed and is a signal obtained by shifting (converting) the frequency of the sweep signal to a mid-band.

Figure 7A:
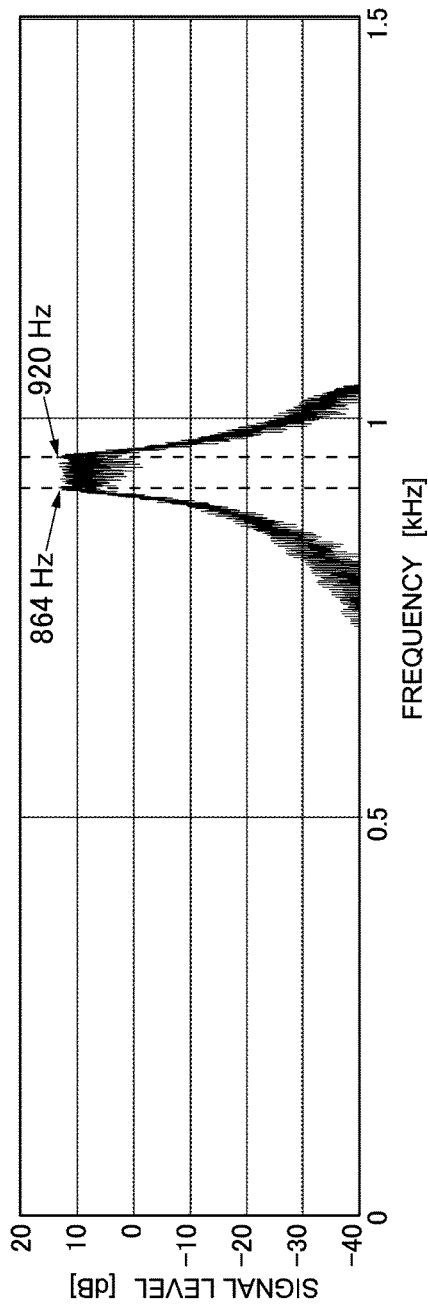
FIG. 7(a) shows frequency characteristics of the first-half sweep signal frequency-converted by the first frequency converter according to the embodiment.
Figure 7B:
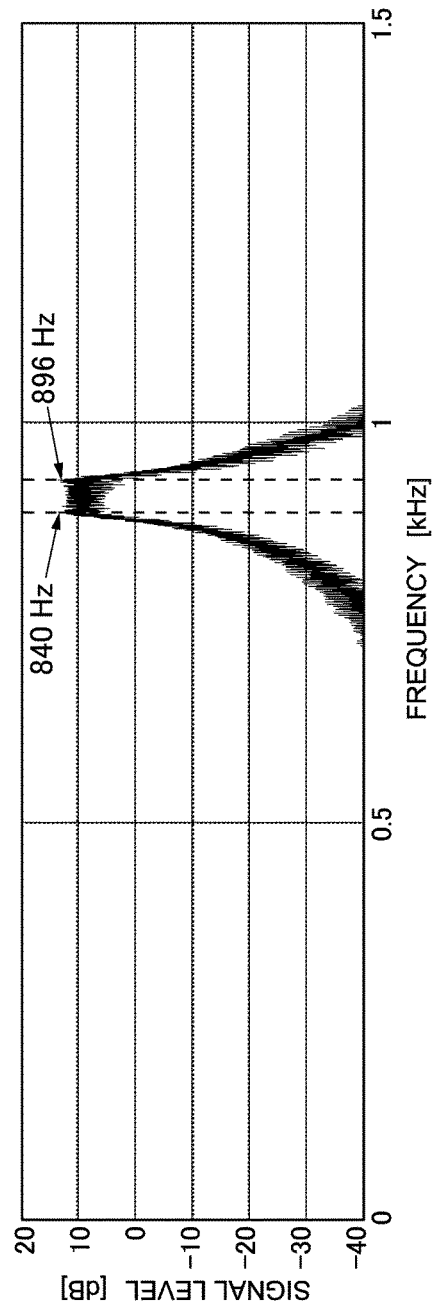
FIG. 7(b) shows frequency characteristics of the second-half sweep signal frequency-converted by a second frequency converter according to the embodiment.

FIG. 7(a) shows frequency characteristics of the signal (higher-band sound signal) obtained by converting the frequency of the first-half sweep signal (higher-band sweep signal) using the first frequency converter 5. FIG. 7(b) shows frequency characteristics of signal (lower-band sound signal) obtained by converting the frequency of the second-half sweep signal (lower-band sweep signal) using the second frequency converter 6. Note that the sinusoidal wave generator 13 generates a sinusoidal wave having a frequency of 800 Hz.

The first-half sweep signal (whose frequency range is 64 Hz to 120 Hz) is multiplied by a sinusoidal wave of 800 Hz. For this reason, the initial frequency of the signal (higher-band sound signal) obtained by frequency-converting the first-half sweep signal (higher-band sweep signal) is 920 Hz (120 Hz+800 Hz), and the target frequency thereof is 864 Hz (64 Hz+800 Hz). Similarly, the initial frequency of the signal (lower-band sound signal) obtained by frequency-converting the second-half sweep signal (lower-band sweep signal) is 896 Hz (96 Hz+800 Hz), and the target frequency thereof is 840 Hz (40 Hz+800 Hz).

The frequency band of the frequency-converted signal is not limited to the range of 840 Hz to 920 Hz described above, and may be any range as long as it is a frequency band that allows the speakers (exciters) EX1 to EX4 to output the frequency-converted signal in the form of sound.

The first frequency converter 5 outputs the first-half sweep signal whose frequency has been converted (shifted) to a mid-frequency band (864 Hz to 920 Hz), to the first adder 7 as first-half sound signal (higher-band sound signal). Similarly, the second frequency converter 6 outputs the second-half sweep signal whose frequency has been converted (shifted) to a mid-frequency band (840 Hz to 896 Hz), to the second adder 8 as second-half sound signal (lower-band sound signal).

The first adder 7 adds the first-half sound signal (higher-band sound signal) received from the first frequency converter 5 to the first-half sweep signal (higher-band sweep signal) received from the sweep signal divider 4. The first adder 7 then the resulting signal to the output signal adjuster 9 as first-half notification signal V1 (first notification signal).

The second adder 8 adds the second-half sound signal (lower-band sound signal) received from the second frequency converter 6 to the second-half sweep signal (lower-band sweep signal) received from the sweep signal divider 4. The second adder 8 then outputs the resulting signal to the output signal adjuster 9 as second-half notification signal V2 (second notification signal).

The output signal adjuster 9 performs control (makes an adjustment) as to the first-half notification signal V1 (first notification signal) received from the first adder 7 and the second-half notification signal V2 (second notification signal) received from the second adder 8 should be outputted to which of the speakers EX1 to EX4 at what timing, on the basis of the speaker control signal received from the signal controller 2.

FIG. 8(a) is a table showing the types of speaker control signals received from the signal controller 2 (alarm type), the directions of alarming matters with respect to the vehicle (the directions of alarming matters), combinations of the speakers that produce output, and notification signals (combinations of speakers and notification signals), and descriptions about notification processes (description).

Notification about Departure from Lane (Left Lane Marking)

When the signal controller 2 receives an alarm signal indicating that the vehicle has departed from the lane, from the alarm signal output unit 100, it determines whether the vehicle has crossed the right lane marking or crossed the left lane marking, on the basis of the alarm signal. For example, if the vehicle has crossed the left lane marking, the signal controller 2 outputs, to the output signal adjuster 9, a speaker control signal which indicates "a notification about the departure from the lane" and indicates "information that the vehicle has crossed the left lane marking". The output signal adjuster 9 determines that the speaker control signal received from the signal controller 2 is "the notification about the departure from the lane" and determines that the speaker control signal indicates that "the vehicle has crossed the left lane marking". The output signal adjuster 9 then outputs a first-half notification signal V1 to the speaker EX1 (exciter) installed in the front-left portion of the seat surface 21.

When the output of the first-half notification signal V1 starts, a vibration of 120 Hz and a sound of 920 Hz are outputted from the speaker EX1. Then, the frequencies of the vibration and sound of the notification signal V1 outputted from the speaker EX1 are gradually reduced at a constant speed (changed from high frequencies to low frequencies at a constant speed). Also, at the timing when the first-half notification signal V1 is outputted as a vibration of 96 Hz and a sound of 896 Hz, the output signal adjuster 9 outputs a second-half notification signal V2 to the speaker EX3 (exciter) installed in the upper-left portion of the backrest 22. When the output of the second-half notification signal V2 starts, a vibration of 96 Hz and a sound of 896 Hz are outputted from the speaker EX3.

The timing when the notification signal V1 is outputted as a vibration of 96 Hz refers to the timing when the frequency of the sinusoidal wave changing from a high frequency to a low frequency at a constant speed in the frequency band of the first-half sweep signal in the notification signal V1 reaches a frequency in the overlap frequency band (96 Hz, which is a high frequency in a range of 64 Hz to 96 Hz).

Then, both the frequencies of the vibration and sound of the notification signal V1 outputted from the speaker EX1 and the frequencies of the vibration and sound of the notification signal V2 outputted from the speaker EX3 are gradually reduced. That is, these frequencies are changed from high frequencies to low frequencies at a constant speed. As seen above, while the notification signal V1 is outputted to the speaker EX1 and the notification signal V2 is outputted to the speaker EX3, the vibration and sound of the first-half notification signal V1 and the vibration and sound of second-half notification signal V2 are being outputted from the speakers EX1 and EX3, so as to overlap each other.

When the first-half notification signal V1 and second-half notification signal V2 are outputted from the speakers EX1 and EX3 as vibrations of 64 Hz and sounds of 896 Hz, the output signal adjuster 9 ends the output of the notification signal V1 to the speaker EX1 installed in the front-left portion of the seat surface 21 and then the vibration and sound of the second-half notification signal V2 is outputted continuously only from the speaker EX3 (exciter) installed in the upper-left portion of the backrest 22.

The timing when the first-half notification signal V1 is outputted as a vibration of 64 Hz refers to the timing when the frequency of the sinusoidal wave changing from a high frequency to a low frequency at a constant speed in the frequency band of the first-half sweep signal in the notification signal V1 departs from a frequency in the overlap frequency band (64 Hz, which is a low frequency in a range of 64 Hz to 96 Hz).

After the second-half notification signal V2 is outputted from the speaker EX3 as a vibration of 40 Hz and a sound of 840 Hz, the output signal adjuster 9 ends the output of the notification signal V2 to the speaker EX3 installed in the upper-left portion of the backrest 22. In the above described case of the notification process, the output duration of the first-half notification signal V1 and second-half notification signal V2 corresponds to one cycle (1 second) of the yet-to-be-divided sweep signal. This notification process is repeatedly performed as long as the signal controller 2 issues a speaker control signal.

As seen above, the notification is made to the driver through the vibration and sound in such a manner that a slight time difference occurs between the first-half notification signal V1 and second-half notification signal V2. The driver can be caused to feel the directional vibration and sound generated thanks to the time difference between the timing when the vibration and sound are outputted from the speaker EX1 and the timing when the vibration and sound are outputted from the speaker EX3. Also, the driver can be caused to recognize the difference between the contents of notifications (the contents of alarms) thanks to the directional vibration and the like.

Specifically, the notification process is performed in such a manner that the second-half vibration and sound of the notification signal V1 outputted from the speaker EX1 and the first-half vibration and sound of the notification signal V2 outputted from the speaker EX3 overlap each other. Thus, the driver can be caused to first feel the vibration and sound using only the front speaker EX1, to then feel the vibrations and sounds using both the front speaker EX1 and upper speaker EX3, and to lastly feel the vibration and sound using only the upper speaker EX3. By causing the driver to feel the vibrations and sounds using the overlap as described above, a directional notification can be further made to the driver.

The frequencies of the vibrations and sounds outputted from the speakers EX1 and EX3 are gradually changed and thus a notification is made to the driver. Thus, even if the vibration and sound are outputted from one of the speakers EX1 and EX3, the driver can be caused to feel changes in the vibration and sound. Thanks to the changes in the vibration and sound, the driver can be caused to feel changes in the notification state in the form of non-monotonous, changing vibration and sound (directional vibration and sound).

Also, in making a notification about the departure from the lane as described above, vibrations and sounds are outputted using time differences, frequency changes, and overlap only from the speakers EX1 and EX3 installed in the left portions of the seat surface 21 and backrest 22. Thus, the driver can intuitively determine what type of alarm the notification made is about, on the basis of the positions of the speakers that have outputted the vibrations and sounds and the combination of such speakers. Also, the driver can determine the direction that he or she should pay attention to.

Also, in making a notification using the speakers EX1 to EX4, a vibration is not simply outputted in accordance with the frequency band of the sweep signal in the notification signal, but rather can be outputted in such a manner that a sound is superimposed on the vibration, in accordance with the mid-frequency band of the sound signal. Thus, the driver can feel the notification in form of vibration, as well as can aurally recognize the notification in the form of sound. As a result, the notification can be made more effectively.

Depending on the traveling state of the vehicle, the driver may be less likely to feel a vibration generated by the speakers EX1 to EX4 due to a vibration from the road surface. In this case, by notifying the driver through not only a vibration but also a sound, the driver can be cautioned more reliably.

Notification about Departure from Lane (Right Lane Marking)

If the signal controller 2 receives, from the alarm signal output unit 100, an alarm signal indicating that the vehicle has departed from the lane and crossed the right lane marking, it outputs, to the output signal adjuster 9, a speaker control signal which indicates a "notification about the departure from the lane" and indicates "information that the vehicle has crossed the right lane marking". The output signal adjuster 9 outputs a notification signal V1 to the speaker EX2 (exciter) installed in the front-right portion of the seat surface 21 on the basis of the speaker control signal received from the signal controller 2 and then the speaker EX2 outputs the received notification signal V1 in the form of vibration and sound. The output signal adjuster 9 then outputs a notification signal V2 to the speaker EX4 (exciter) installed in the upper-right portion of the backrest 22 and then the speaker EX4 outputs the received notification signal V2 in the form of vibration and sound.

Notification about Approach of Vehicle (from Front)

If the signal controller 2 receives, from the alarm signal output unit 100, an alarm signal indicating that a vehicle is approaching from front, it outputs, to the output signal adjuster 9, a speaker control signal which indicates a "notification about the approach of a vehicle" and indicates "information that the vehicle is approaching from front". The output signal adjuster 9 outputs a notification signal V1 to the speakers EX1 and EX2 installed in the front-left and front-right portions of the seat surface 21 on the basis of the speaker control signal received from the signal controller 2 and then the speakers EX1 and EX2 output the received notification signal V1 in the form of vibration and sound. The output signal adjuster 9 then outputs a notification signal V2 to the speakers EX3 and EX4 installed in the upper-left and upper-right portions of the backrest 22 and then the speakers EX3 and EX4 output the received notification signal V2 in the form of vibration and sound.

Notification about Approach of Vehicle (from Rear)

If the signal controller 2 receives, from the alarm signal output unit 100, an alarm signal indicating that a vehicle is approaching from the rear, it outputs, to the output signal adjuster 9, a speaker control signal which indicates a "notification about the approach of a vehicle" and indicates "information that the vehicle is approaching from the rear". The output signal adjuster 9 outputs a notification signal V1 to the speakers EX3 and EX4 installed in the upper-left and upper-right portions of the backrest 22 on the basis of the speaker control signal received from the signal controller 2 and then the speakers EX3 and EX4 output the received notification signal V1 in the form of vibration and sound. The output signal adjuster 9 then outputs a notification signal V2 to the speakers EX1 and EX2 installed in the front-left and front-right portions of the seat surface 21 and then the speakers EX1 and EX2 output the received notification signal V2 in the form of vibration and sound.

Notification about Doze

If the signal controller 2 receives, from the alarm signal output unit 100, an alai in signal indicating that a doze of the driver has been detected, it outputs, to the output signal adjuster 9, a speaker control signal indicating "information that the doze has been detected". The output signal adjuster 9 then outputs a notification signal V1 to the speakers EX1 to EX4 at the same timing on the basis of the speaker control signal received from the signal controller 2 and then the speakers EX1 to EX4 output the received notification signal V1 in the form of vibration and sound.

Notification about Sharp Curve

If the signal controller 2 receives, from the alarm signal output unit 100, an alarm signal indicating that a sharp curve has been detected, it outputs, to the output signal adjuster 9, a speaker control signal indicating "information that the sharp curve has been detected". The output signal adjuster 9 outputs a notification signal V1 to the speakers EX1 and EX2 installed in the front-left and front-right portions of the seat surface 21 on the basis of the speaker control signal received from the signal controller 2 and then the speakers EX1 and EX2 output the received notification signal V1 in the form of vibration and sound. The output signal adjuster 9 then outputs a notification signal V2 to the speakers EX3 and EX4 installed in the upper-left and upper-right portions of the backrest 22 and then the speakers EX3 and EX4 output the received notification signal V2 in the form of vibration and sound.

As described above, the driver can intuitively determine what type of alarm the notification made is about, on the basis of the positions of the speakers that have outputted the vibrations and sounds and the combination of such speakers. Also, the driver can determine the direction that he or she should pay attention.

As described above, the vehicle alarm device 1 according to the present embodiment has the exciters installed in the cushion of the seat surface 21 and backrest 22 and thus is able to reduce the occurrence of vibrations in multiple positions (places) caused by resonance.

Also, the vehicle alarm device 1 is able to output a notification about the departure from the lane, a notification about the approach of a vehicle, a notification about a doze, a notification about a sharp curve, and the like using time-divided or frequency-divided sweep signals in the form of vibrations from the speakers (exciters) EX1 to EX4 installed in the seat surface 21 and backrest 22. It is also able to output these notifications in the form of sounds using mid-band sound signals resulting from frequency conversion. Thus, effective notifications can be made to the driver. Also, it is possible to notify the driver of directional information and thus to improve the recognition of the alarm by the driver.

Also, the vehicle alarm device 1 according to the present embodiment frequency-converts the frequency band of a sweep signal to be outputted in the form of vibration to a mid-frequency band and thus is able to output not only a vibration but also a sound from the speakers (exciters) EX1 to EX4 as a notification. As seen above, the use of exciters allows both vibrations and sounds to be outputted, thereby eliminating the need to separately install a vibration output device (vibration generator) and a sound output device (sound playback speaker). Also, since both vibrations and sounds are outputted from the same speakers (exciters) EX1 to EX4, it is possible to improve the recognition of the alarm (notification) by the driver.

While the notification device and notification method according to the present invention have been described in detail using the vehicle alarm device 1 according to the embodiment as an example, the notification device and notification method according to the present invention are not limited to the example described in the embodiment. Those skilled in the art would apparently conceive of various changes or modifications thereto without departing from the scope of claims, and such changes or modifications can also produce effects similar to those of the vehicle alarm device 1 described in the embodiment.

For example, the vehicle alarm device 1 according to the embodiment outputs a first-half notification signal V1 and a second-half notification signal V2 in such a manner that these signals overlap each other. Since the vehicle alarm device 1 outputs not only vibrations but also sounds in outputting these notification signals, a first-half sound and a second-half sound are outputted so as to overlap each other during the overlap and thus the gain of the sounds is doubled. In this case, the magnitude (gain) of the notification sounds may be reduced during the overlap. By adjusting the gain of the sounds during the overlap, the notification sounds can be prevented from being increased excessively. Also, it is possible to cause the driver to intuitively recognize a directional notification process from the output of a first-half sound to the output of a second-half sound in such a manner that the driver does not feel auditory discomfort.

In the above embodiment, the vehicle alarm device 1 sets the target frequency of a sweep signal to a higher frequency value than the initial frequency and changes (sweeps) the frequency of a sinusoidal wave from a high frequency to a low frequency at a constant speed. However, the frequency need not be changed (swept) from a high frequency to a low frequency and may be changed from a low frequency to a high frequency. The frequency may be changed in any direction as long as a feeling of transition caused by changes in the frequency can be given to the driver.

Also, in the vehicle alarm device 1 according to the embodiment, the first frequency converter 5 or second frequency converter 6 generates mid-band sound signals by multiplying sweep signals by a sinusoidal wave of 800 Hz, as shown in FIG. 6. However, a human is less likely to sufficiently feel the transition of the frequency (changes in the frequency of a sound signal) when the frequency is increased, since the human's auditory sense has logarithmic characteristics. Also, a human is less likely to sufficiently feel the transition of the frequency if the frequency band in which the frequency of a sound signal is changed is narrow. For this reason, the frequency of a sweep signal may be expanded so that the driver recognizes changes in the frequency of a sound in a mid-frequency band, in place of converting the frequency of a sweep signal using the first frequency converter 5 or second frequency converter 6 as shown in FIG. 6.

FIG. 8(b) is a block diagram showing an example of a frequency expander (frequency converter) 30 used in the vehicle alarm device 1 in place of the first frequency converter 5 and second frequency converter 6. The frequency expander 30 expands the frequency and bandwidth of sweep signals. The frequency expander 30 includes a square unit 31, an HPF (high-pass filter) unit 32, and a gain unit 33.

The square unit 31 squares a first-half sweep signal (higher-band sweep signal) or second-half sweep signal (lower-band sweep signal) received from the sweep signal divider 4 to obtain a sound signal (higher-band sound signal, lower-band sound signal) which has a doubled frequency and bandwidth and which are audible as a sound.

The HPF unit 32 eliminates (reduces) signal output near the DC component (direct-current component) (near 0 Hz) of the sound signal obtained by the square unit 31 by high-pass-filtering the sound signal. The gain unit 33 doubles the amplitude of the resulting sound signal. Thus, the amplitude of the sound signal can be adjusted so that the it becomes the same as the amplitude of the sweep signal inputted to the frequency expander 30.

Multiple sets of the square unit 31, the HPF unit 32, and the gain unit 33 may be cascade-connected together as necessary. Thus, the frequency and bandwidth of the sound signal can be expanded by a factor of 2, 4, 8, 16, or the like.

Figure 9:
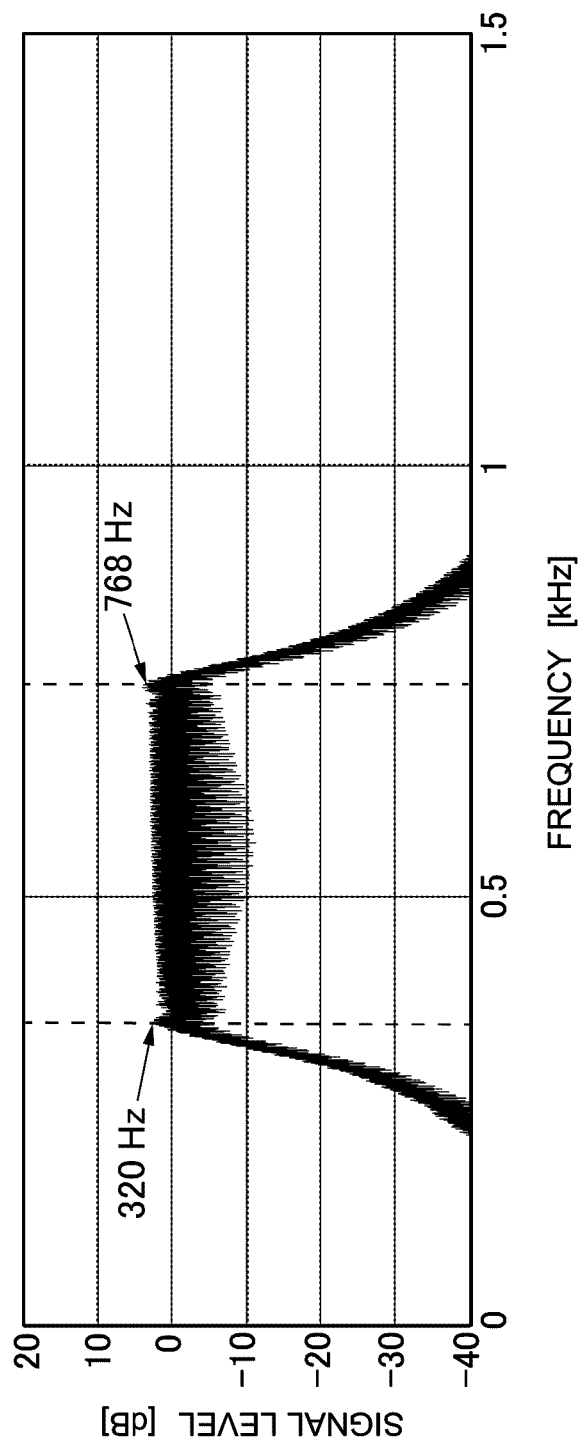
FIG. 9 is a diagram showing frequency characteristics of a sound signal generated by the frequency expander according to the embodiment.

FIG. 9 shows frequency characteristics of sound signal obtained by inputting the second-half sweep signal (lower-band sweep signal) shown in FIG. 5(c) to the frequency expander 30 in which three sets of the square unit 31, the HPF unit 32 and the gain unit 33 are cascade-connected together and expanding the frequency and bandwidth by a factor of 8. The initial frequency of the second-half sweep signal (lower-band sweep signal) shown in FIG. 5(c) is 96 Hz, and the target frequency thereof is 40 Hz. Accordingly, in the frequency characteristics shown in FIG. 9, the sound signal has an initial frequency of 768 Hz and a target frequency of 320 Hz obtained by expanding the frequency and bandwidth by a factor of 8.

The first adder 7 and second adder 8 add the sound signals thus generated to the original sweep signals, and the resulting signals are outputted to the speakers EX1 to EX4. Thus, not only the lower-band sweep signals that generate vibrations but also the sound signals that generate sounds whose frequency and bandwidth are expanded by a factor of 8 (lower-band sound signals) can be outputted to the driver.

The frequency expander 30 can expand the amplitude of the mid-band sound signals by a factor of 8 compared to the first frequency converter 5 and second frequency converter 6 shown in FIG. 6. Thus, the driver is more likely to feel the transition (change) of the frequency of the sounds outputted, and it is possible to improve the recognition of the notification signals by the driver.

Instead of providing the frequency expander 30 in the vehicle alarm device 1 in place of the first frequency converter 5 and second frequency converter 6, the bandwidth of the sound signals frequency-converted to a mid-frequency band by the first frequency converter 5 and second frequency converter 6 may be expanded several times to improve the recognition of the notification signals by the driver. For example, the bandwidth of the sound signal shown in FIGS. 7(a) and 7(b) is 80 Hz between 840 Hz and 920 Hz. However, this bandwidth may be expanded to 160 Hz or 320 Hz.

Preferably, the frequency band of the sound signal expanded by the frequency expander 30, the frequency band of the sound signal converted by the first frequency converter 5 and second frequency converter 6, or the frequency band obtained by expanding the converted bandwidth of the sound signal is a frequency band different from the traveling noise of the vehicle (distinguishable mid-frequency band) so that the notification sound (the output of the sound signal) is not masked (is not made less audible) by the traveling noise.

The frequency expander 30 and frequency converters 5 and 6 may be combined in the vehicle alarm device 1. Thus, after the frequency expander 30 expands the frequency band, the frequency converters 5 and 6 can convert the expanded frequency to any mid-frequency in which the notification sounds are not masked by the traveling sounds.

REFERENCE SIGNS LIST 1 vehicle alarm device (notification device)
2 signal controller (signal output determination unit)
3 sweep signal generator
4 sweep signal divider
5 first frequency converter (frequency converter)
6 second frequency converter (frequency converter)
7 first adder
8 second adder
9 output signal adjuster
11 Hilbert transformer (of first frequency converter or second frequency converter)
12 delay unit (of first frequency converter or second frequency converter)
13 sinusoidal wave generator (of first frequency converter or second frequency converter)
14 first multiplier (of first frequency converter or second frequency converter)
15 second multiplier (of first frequency converter or second frequency converter)
16 phase inverter (of first frequency converter or second frequency converter)
17 third adder (of first frequency converter or second frequency converter)
20 driver's seat (seat)
21 seat surface (of driver's seat)
22 backrest (of driver's seat)
30 frequency expander (frequency converter)
31 square unit (of frequency expander)
32 HPF unit (of frequency expander)
33 gain unit (of frequency expander)
100 alarm signal output unit
EX1 to EX4 speaker (exciter)

The invention claimed is:

1. A notification device comprising:
a plurality of exciters installed in cushion portions of a seat and being located in different positions of the seat;
a sweep signal generator configured to generate a sweep signal capable of continuously changing a frequency of a vibration outputted from the exciters, by changing a frequency of a predetermined wave at a constant speed in a frequency band which allows the exciters to output a signal in the form of vibration;
a sweep signal divider configured to divide the sweep signal into a higher-band sweep signal that continuously changes the frequency of the vibration by changing the frequency of the predetermined wave in a higher-frequency band which includes an overlap frequency band and whose frequencies are equal to or higher than frequencies in the overlap frequency band, the overlap frequency band being a part of the frequency band in which the frequency of the predetermined wave of the sweep signal is changed at the constant speed, and a lower-band sweep signal that continuously changes the frequency of the vibration by changing the frequency of the predetermined wave in a lower-frequency band which includes the overlap frequency band and whose frequencies are equal to or lower than the frequencies in the overlap frequency band;

a signal output determination unit configured to determine that at least one of the higher-band sweep signal and the lower-band sweep signal should be outputted to at least one of the exciters and to determine that at least the other of the higher-band sweep signal and the lower-band sweep signal should be outputted to at least one of the other exciters; and an output signal adjuster configured to make an adjustment for outputting the higher-band sweep signal and the lower-band sweep signal to the at least one of the exciters and the at least one of the other exciters, determined by the signal output determination unit.

2. The notification device according to claim 1, wherein in outputting the higher-band sweep signal and the lower-band sweep signal to the at least one of the exciters and the at least one of the other exciters, determined by the signal output determination unit, the output signal adjuster starts to output the higher-band sweep signal to the at least one of the exciters, then starts to output the lower-band sweep signal to the at least one of the other exciters at the timing when the frequency of the predetermined wave of the higher-band sweep signal changing from a high frequency to a low frequency at the constant speed reaches a frequency in the overlap frequency band, and ends output of the higher-band sweep signal to the at least one of the exciters at the timing when the frequency of the predetermined wave of the higher-band sweep signal changing from the high frequency to the low frequency at the constant speed departs from a frequency in the overlap frequency band.

3. The notification device according to claim 1, further comprising:

a frequency converter configured to generate a higher-band sound signal and a lower-band sound signal by frequency-converting the higher-frequency band in which the frequency of the predetermined wave of the higher-band sweep signal is changed at the constant speed and the lower-frequency band in which the frequency of the predetermined wave of the lower-band sweep signal is changed at the constant speed to frequency bands that allow the exciters to output a signal in the form of sound;

a first adder configured to add the higher-band sound signal to the higher-band sweep signal to generate a first notification signal; and a second adder configured to add the lower-band sound signal to the lower-band sweep signal to generate a second notification signal, wherein the signal output determination unit determines that at least one of the first notification signal and the second notification signal should be outputted to the at least one of the exciters and determines that at least the other of the first notification signal and the second notification signal should be outputted to the at least one of the other exciters, and the output signal adjuster outputs the first notification signal and the second notification signal to the at least one of the exciters and the at least one of the other exciters, determined by the signal output determination unit.

4. The notification device according to claim 3, wherein in outputting the first notification signal and the second notification signal to the at least one of the exciters and the at least one of the other exciters, determined by the signal output determination unit, the output signal adjuster starts to output the first notification signal to the at least one of the exciters, then starts to output the second notification signal to the at least one of the other exciters at the timing when the frequency of the predetermined wave changing from a high frequency to a low frequency at the constant speed in the frequency band of the higher-band sweep signal in the first notification signal reaches a frequency in the overlap frequency band, and ends output of the first notification signal to the at least one of the exciters at the timing when the frequency of the predetermined wave changing from the high frequency to the low frequency at the constant speed in the frequency band of the higher-band sweep signal in the first notification signal departs from a frequency in the overlap frequency band.

5. The notification device according to claim 1, wherein the signal output determination unit determines that at least one of the signals should be outputted to at least one of the exciters, on the basis of a type of an alarm signal received from an alarm signal output unit.

6. The notification device according to claim 1, wherein the exciters are installed in left and right positions of a seat surface of the seat and in left and right positions of a backrest of the seat.

7. A notification method using a notification device comprising:

a sweep signal generation step of generating, by a sweep signal generator, a sweep signal capable of continuously changing a frequency of a vibration outputted from a plurality of exciters installed in cushion portions of a seat and being located in different positions of the seat, by changing a frequency of a predetermined wave at a constant speed in a frequency band which allows the exciters to output a signal in the form of vibration;

a sweep signal division step of dividing, by a sweep signal divider, the sweep signal into a higher-band sweep signal that continuously changes the frequency of the vibration by changing the frequency of the predetermined wave in a higher-frequency band which includes an overlap frequency band and whose frequencies are equal to or higher than frequencies in the overlap frequency band, the overlap frequency band being a part of the frequency band in which the frequency of the predetermined wave of the sweep signal is changed at the constant speed, and a lower-band sweep signal that continuously changes the frequency of the vibration by changing the frequency of the predetermined wave in a lower-frequency band which includes the overlap frequency band and whose frequencies are equal to or lower than the frequencies in the overlap frequency band;

a signal output determination step of determining, by a signal output determination unit, that at least one of the higher-band sweep signal and the lower-band sweep signal should be outputted to at least one of the exciters and determining that at least the other of the higher-band sweep signal and the lower-band sweep signal should be outputted to at least one of the other exciters; and an output signal adjustment step of making, by an output signal adjuster, an adjustment for outputting the higher-band sweep signal and the lower-band sweep signal to the at least one of the exciters and the at least one of the other exciters, determined in the signal output determination step.

8. The notification method using the notification device according to claim 7, wherein the output signal adjustment step of outputting the higher-band sweep signal and the lower-band sweep signal to the at least one of the exciters and the at least one of the other exciters, determined in the signal output determination step comprises the output signal adjuster starting to output the higher-band sweep signal to the at least one of the exciters, then starting to output the lower-band sweep signal to the at least one of the other exciters at the timing when the frequency of the predetermined wave of the higher-band sweep signal changing from a high frequency to a low frequency at the constant speed reaches a frequency in the overlap frequency band, and ending output of the higher-band sweep signal to the at least one of the exciters at the timing when the frequency of the predetermined wave of the higher-band sweep signal changing from the high frequency to the low frequency at the constant speed departs from a frequency in the overlap frequency band.

9. The notification method using the notification device according to claim 7, further comprising:
a frequency conversion step of generating, by a frequency converter, a higher-band sound signal and a lower-band sound signal by frequency-converting the higher-frequency band in which the frequency of the predetermined wave of the higher-band sweep signal is changed at the constant speed and the lower-frequency band in which the frequency of the predetermined wave of the lower-band sweep signal is changed at the constant speed to frequency bands that allow the exciters to output a signal in the form of sound;
a first addition step of adding, by a first adder, the higher-band sound signal to the higher-band sweep signal to generate a first notification signal; and
a second addition step of adding, by a second adder, the lower-band sound signal to the lower-band sweep signal to generate a second notification signal, wherein
the signal output determination step comprises the signal output determination unit determining that at least one of the first notification signal and the second notification signal should be outputted to the at least one of the exciters and determining that at least the other of the first notification signal and the second notification signal should be outputted to the at least one of the other exciters, and
the output signal adjustment step comprises the output signal adjuster outputting the first notification signal and the second notification signal to the at least one of the exciters and the at least one of the other exciters, determined in the signal output determination step.

10. The notification method using the notification device according to claim 9, wherein the output signal adjustment step of outputting the first notification signal and the second notification signal to the at least one of the exciters and the at least one of the other exciters, determined in the signal output determination step comprises the output signal adjuster starting to output the first notification signal to the at least one of the exciters, then starting to output the second notification signal to the at least one of the other exciters at the timing when the frequency of the predetermined wave changing from a high frequency to a low frequency at the constant speed in the frequency band of the higher-band sweep signal in the first notification signal reaches a frequency in the overlap frequency band, and ending output of the first notification signal to the at least one of the exciters at the timing when the frequency of the predetermined wave changing from the high frequency to the low frequency at the constant speed in the frequency band of the higher-band sweep signal in the first notification signal departs from a frequency in the overlap frequency band.

* * * * *